Oct. 13, 1936.　　　E. T. BRYANT　　　2,056,954
JACKING APPARATUS
Filed May 19, 1934
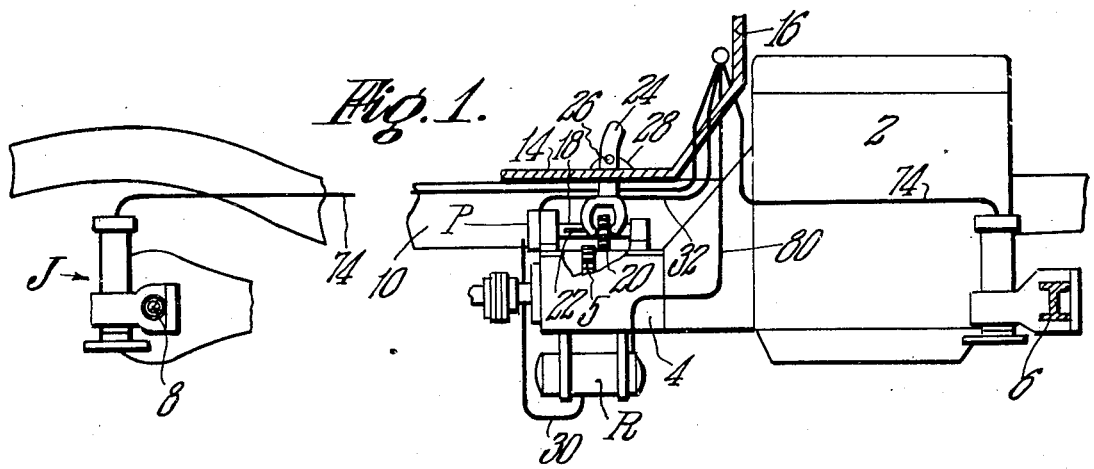
INVENTOR.
Erwin T. Bryant.
BY Walter C. Ross
ATTORNEY.

Patented Oct. 13, 1936

2,056,954

UNITED STATES PATENT OFFICE 2,056,954

JACKING APPARATUS

Erwin T. Bryant, Farley, Mass.

Application May 19, 1934, Serial No. 726,496

1 Claim. (Cl. 254—86)

This invention relates to improvements in jacking apparatus for automobiles and the like.

The principal objects of the invention are directed to the provision of jacking apparatus for automobiles, trucks and the like, whereby either or both sides of the forward or rear ends of the vehicle may be jacked independently of the other or simultaneously so that all four corners of the vehicle may be elevated from the floor or ground surface.

According to a special feature of the invention, separate jacks are associated with the forward and rear axles of the automobile and they are arranged for independent operation by means of fluid pressure. The fluid pressure is supplied by means of a pressure device such as a pump which is driven by the engine and the fluid pressure mechanism is connected to the several jack devices and to a control apparatus whereby it is possible to operate one or more of the jacks as may be desired.

Various novel features and advantages of the invention will be more fully hereinafter referred to in connection with the accompanying description of the preferred form of the invention, reference being had to the accompanying drawing wherein:

Fig. 1 is a sectional elevational view showing certain parts of an automobile with which the apparatuses of the invention are associated, Fig. 2 is a small scale, more or less diagrammatic plan view showing the location of the jacking devices, Fig. 3 is a vertical, sectional view through one of the jacking devices of the invention, and Fig. 4 is a diagrammatic view showing how the various parts of the mechanism of the invention are associated.

Referring to the drawing now in detail, the invention will be more fully described.

In Fig. 1 there is shown an engine 2 which has at its rear side the usual transmission and gear 5. A front axle 6 and a rear axle 8 are disposed beneath side members 10 of the frame of an automobile. A plurality of jack devices indicated generally by J are associated as shown in Fig. 2 with the front and rear axles and are preferably adjacent the outer ends of the axles. These devices will be more fully hereinafter described.

A reservoir R is shown as being supported at the underside of the transmission and a floor board 14 and dash 16 are disposed above the transmission and rearwardly of the engine in the usual manner.

A pump P has an outwardly extending shaft 18 on which is slidable a gear 20. The gear 20 is held against rotation on the shaft by means of a key such as 22 or any other suitable means.

A lever 24, pivoted at 26 to a bracket such as 28, has a lower fork end which straddles the gear 20 substantially as shown. In this way, by moving the lever 24 fore and aft, the gear 20 may be shifted along the shaft 18 of the pump into and out of mesh with the gear 5 of the transmission. Thus, by bringing the gear 20 into engagement with the gear 5, the pump P is operated by the transmission, which is desirable in connection with apparatus of the type to which the invention relates.

A suction pipe 30 connects the reservoir R with the pump P as shown and a pipe 32 connects the discharge side of the pump with a header member 34.

The jack device J which may be used at the four corners of a vehicle is shown more clearly in Fig. 3 and will now be described.

A base member 40 is rigidly secured to the vehicle as to the rear axle 8 thereof in any suitable manner. In the form of the invention shown, lugs 42 extend from the base around the axle and a plate 44 is disposed outside the axle. The plate 44 is acted upon by bolts 46 so that the axle may be clamped between the lugs 42 and the clamp plate 44.

A shell or sleeve member such as 48 extends upwardly from the member 40 with its lower end suitably secured therein as by screw threads shown. A cap 50 may be secured to the upper end of the sleeve 48 and this receives a fitting 52' to which is connected a conduit or pipe for delivering fluid into the jack device.

A sleeve 52 is slidable within the member 48 and this has fixed to its lower end a header member 54. A piston such as 56 is associated with the upper side of the sleeve 52 and there is provided an opening 58 therethrough. This opening 58 is provided to allow fluid to pass into the sleeve 52.

A rod 60 is slidable in the member 54 and it carries piston 62 on its upper end which slidably extends within the sleeve 52. A supporting pad which may be of any desired form and size is fixed to the lower end of the rod 60.

A spring 66 is disposed within the shell 48 and is interposed between the piston 56 and the lower part of the member 40. Another spring 68 surrounds the rod 60 and is interposed between the piston 62 and the member 54.

Thus, as pressure is applied to the jack device, the piston 56 and sleeve 52 are forced downwardly within the shell 48 while the piston 62 and rod 60 are forced downwardly within the sleeve 52 so that pad 64 is lowered onto the ground or roadway. Thus as pressure is built up the downward movement of the parts described causes the axle, and, of course, the automobile supported thereby, to be elevated. When pressure is released, the springs 66 and 68 return the parts to the position shown in Fig. 3.

As has been explained, there is preferably a jack device on the opposite ends of each of the axles so that it is possible to elevate either or both ends of either or both axles by admitting fluid under pressure to the jack. As has been described the fluid is pumped from the reservoir R to a header 34 which may be conveniently located on the dash.

With reference to Fig. 4, the connectoin between the various units of the apparatus will be described.

A check valve 70 is provided in the connection 32 between the pump P and header 34 as shown. Conduits 74 extend from the header 34 to each of the jack devices and valves 76 are provided so that fluid may flow to any one of the jack devices or as many as may be desired.

A pressure relief valve 78 is provided in a conduit 80 which connects the header 34 with the reservoir tank R. A conduit 82 is by-passed around the pressure relief valve 78 and a return valve 84 is provided in this conduit 82.

As the pump is operated by means of the transmission, fluid passes through the check valve 70 and into the header 34. Thus, by opening one of the valves 76, the fluid is forced into the jack device associated therewith. As pressure is built up by the pump the jack device is operated after the manner described.

It may be seen that when the parts of the jack have been extended so that the axle is elevated, the excess pressure in the conduits is relieved by the pressure-relief valve 78, which, of course, will be set in some manner so that sufficient pressure is maintained so that the jack will hold the axle in a desired elevated position.

When it is desired to lower the axle, the valve 84 is opened and thereby the pressure in the header 34 and conduits 74 is relieved whereupon the springs 66 and 68 of the jack device return the parts of the jack to their normal positions.

While I have described my invention in great detail and with respect to a preferred embodiment thereof, I do not desire to be limited to such detail or embodiment since many changes and modifications may be made without departing from the spirit and scope of the invention in its broader aspects. Hence, what I desire to claim as new and secure by Letters Patent of the United States is:

In combination with an axle of an automobile, a jack device comprising, a base member rigidly secured to the axle, a tubular outer shell extending upwardly from said base member and having its lower end portion in threaded engagement therewith, a closure cap secured to the upper end of said outer shell and provided with an opening for permitting fluid pressure to enter therein, a tubular inner shell slidable within the outer shell, a header member disposed below said base member and carried by the lower end of said inner shell, a piston carried by the upper end of said inner shell below said closure cap and arranged to be slidable in the outer shell along with said inner shell, said piston being provided with an opening therethrough for permitting fluid pressure to enter the inner shell, a rod slidable in said header member and having its upper end portion extending upwardly into the inner shell, a piston carried on the upper end of said rod below the first-named piston and arranged to be slidable within said inner shell along with the rod, a supporting pad fixed to the lower end of said rod below said header member, a spring surrounding the inner shell and extending vertically within the outer shell between the lower part of said base member and the under side of the first-named piston for urging the said piston and inner shell upwardly, and a spring surrounding said rod and extending vertically within the inner shell between said header member and the last-named piston for urging the said piston and rod upwardly.

ERWIN T. BRYANT.